May 17, 1938.　　F. G. G. ARMSTRONG　　2,117,643
HYDRAULIC SHOCK ABSORBER OR OTHER DAMPING MEANS
Filed Oct. 1, 1936　　2 Sheets-Sheet 2
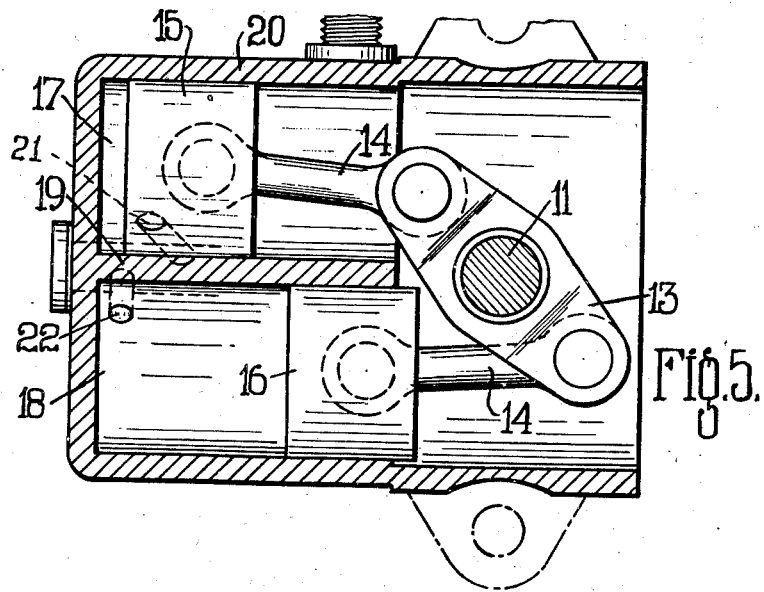
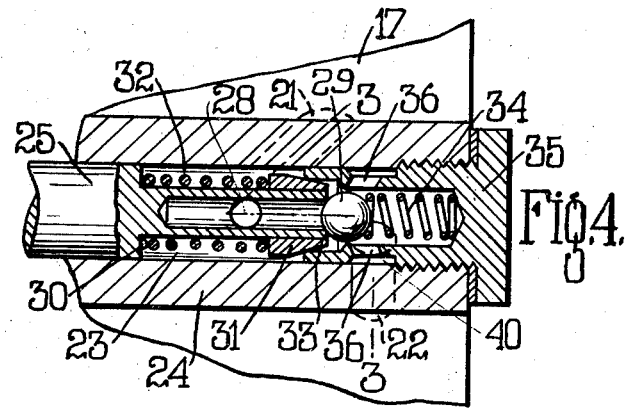
Inventor:
Fullerton G. G. Armstrong
By: Mason & Porter
Attorneys Patented May 17, 1938

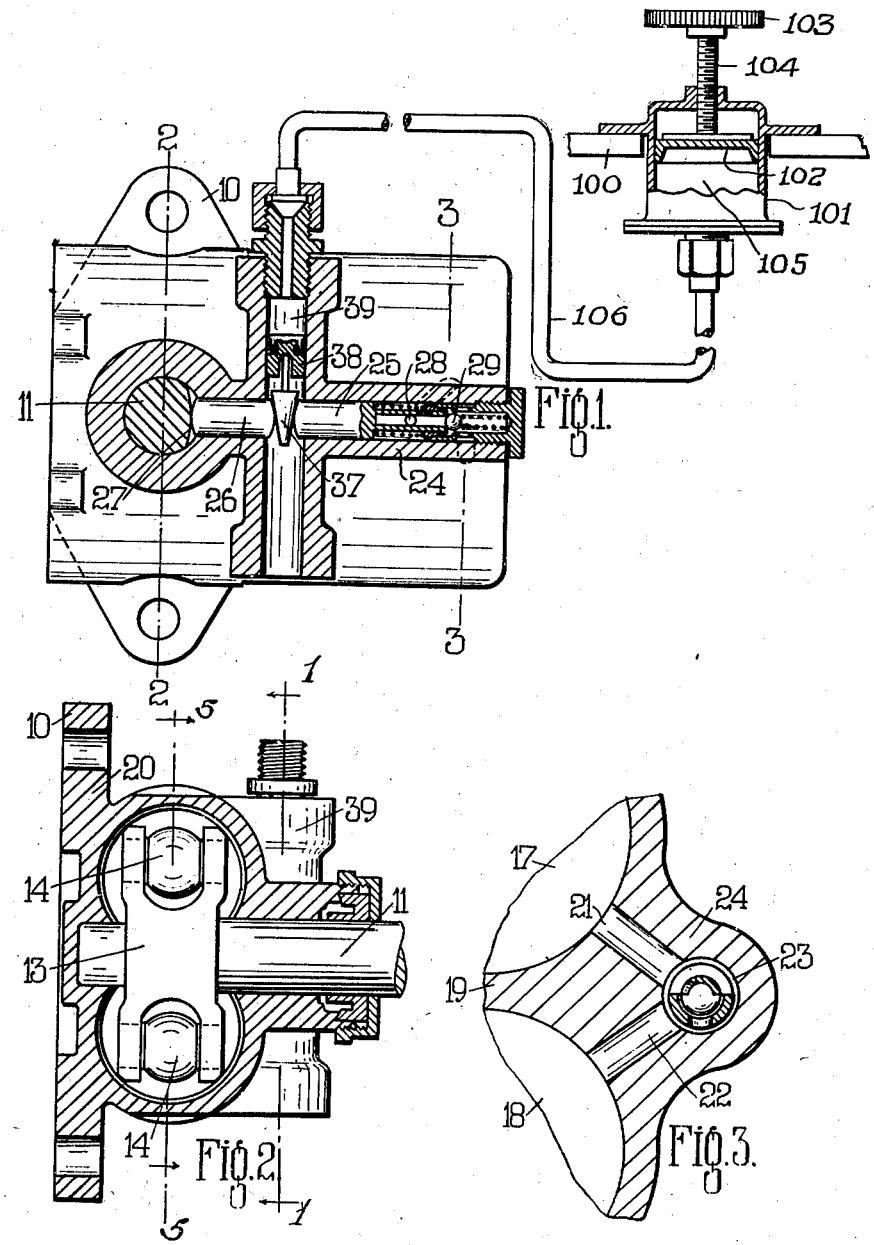

2,117,643

UNITED STATES PATENT OFFICE 2,117,643

HYDRAULIC SHOCK ABSORBER OR OTHER DAMPING MEANS

Fullerton George Gordon Armstrong, Beverley, England

Application October 1, 1936, Serial No. 103,583
In Great Britain October 25, 1935

9 Claims. (Cl. 188—88)

The present invention relates to hydraulic shock absorbers or the like differential pressure operated damping means of the type wherein a restricted passage forms a resistance to fluid flow such as, for example, between the ends of a cylinder in which a double acting piston operates or again, between a pair of cylinders in each of which a piston is displaceable on operation of a shock absorber, and wherein the restriction to fluid flow consists of a pair of valves one restricting the flow in one direction between the piston chambers and the other restricting the flow in the reverse direction.

The object of the present invention is to provide a relatively simple construction in differential pressure operated damping means of the type described, that is to say, a construction employing a minimum number of parts and a consequential smaller number of adjustments for similar or better results than in known constructions of this type.

A further object of the invention is to provide a hydraulic shock absorber wherein valves are situated adjacent each other at one end of a spindle which is displaceable by means rotatable with the shaft of the shock absorber.

A further object of the invention is to provide a hydraulic shock absorber of the above type, wherein the valves are initially and resiliently loaded, and wherein the valves may be adjusted in unison by independent adjusting means whereby a differential adjustment of the valves may be obtained.

The invention is more particularly described with reference to the accompanying drawings, in which:—

Figure 1 is a longitudinal section taken along line 1—1 of Figure 2 through one form of hydraulic shock absorber according to the present invention, and showing diagrammatically a remote control for effecting adjustment.

Figure 2 is a sectional view on the line 2—2 of Figure 1.

Figure 3 is a section on the line 3—3 of Figure 1.

Figure 4 is a detail of the valve shown in Figure 1, but on a larger scale.

Figure 5 is a longitudinal sectional view taken along line 5—5 of Figure 2 of the shock absorber in a plane parallel to that of Figure 1, but through a pair of cylinders within which a pair of pistons are reciprocable in opposite directions on actuation of the shock absorber.

In the particular construction which is described as one example of the present invention and is illustrated in the drawings a differential pressure operated shock absorber is mounted by means of brackets 10 on the frame of a vehicle, and has a shaft 11 which is connected by means of an arm 12 and a link (not shown) to a wheel axle so that on displacement of the wheel axle relatively to the vehicle body or frame, an angular displacement is imparted to the shaft 11 about its own axis. A lever 13 is rigidly mounted on the shaft 11 and at its ends carries rods 14 of pistons or plungers 15, 16, reciprocable in chambers 17, 18 respectively which are formed in the shock absorber housing 20 and are separated by a partition 19.

Passages 21, 22 lead from the chambers 17, 18 respectively to a bore 23 formed in a portion 24 of the housing 20 of the shock absorber which lies at one side of the division wall 19. In said bore is located a compound spindle or push rod made up of coaxial lengths 25, 26, one end of which bears against a cam surface 27, on the shaft 11 and the other end of which is hollow with a radial passage 28 formed therein, the hollow end forming the seating for a ball or other non-return valve 29.

A shoulder 30 is formed at the hollow end of the spindle whilst a tapered sleeve valve 31 surrounds said hollow end and is maintained away from the shoulder 30 by means of a spring 32. The ball or other non-return valve is held on its seat 33 constituted by the hollow end of the spindle or push rod 25, by means of a spring 34 housed within a recess in a screw-threaded cap 35 which is adjustable externally of the shock absorber to vary the load on the ball valve.

The sleeve-like portion of the cap 35 has ports 36 formed therein at a part where the radius of the cap is such as to form an annular passage 40 between the cap and the portion 24 of the housing of the shock absorber, which annulus is in hydraulic communication with the passage 22. The free end of the cap 35 constitutes a seating for the tapered sleeve 31.

A wedge 37 is displaceable transversely of and between the parts 25, 26 of the compound spindle in order to vary the effective length of the spindle. For a given adjustment of the wedge 37, the length of the compound spindle 25, 26 will not be caused to vary when it is moved by means of the cam surface 27 on the shaft 11. Said wedge 37 is pivotally mounted on a plunger 38 which is adapted to be displaced by liquid within a cylinder 39 the volume of which liquid is varied by a remote control on the dashboard or at any other convenient part of the vehicle on which the shock absorber is mounted. For instance, in the diagrammatic showing of a remote control according to Figure 1, the dashboard 100 of the vehicle carries a small chamber 101 within which a piston 102 or the like is displaceable by means of a spindle 104 which threadedly engages the chamber 101 and carries a knurled head 103. Thus, the space 105 within the chamber 101 is adjustable on rotation of the head 103, and this space communicates with the chamber 39 of the shock absorber through a conduit 106, so that hydraulic pressure will be applied to or released from the plunger 38 upon movement of the piston or hydraulic washer 102. Thus, the load on the valves can be adjusted by a remote control device located at some convenient part of the vehicle, as for instance, on the dashboard.

It will thus be seen that when the arm 12 of the shock absorber is displaced the pistons 15 and 16 are reciprocated in opposite directions to cause liquid to pass from one of the chambers 17, 18 to the other according to the particular displacement of the pistons. If the piston 15 has a compression action on outward displacement of the arm 12 fluid is caused to pass through the port 21 into the bore 23 thence through the port 28 and out of the hollow end of the spindle past the ball valve 29 through the ports 26 into the annulus 40 and thence through the passage 22 into the chamber 18. On return movement of the arm 12 the piston 16 effects its compression stroke to cause liquid to pass through the passage 22 into the annulus 40 around the ports 36 and being unable to enter the hollow bore of the spindle 25 past the ball valve 29 said displaced liquid moves the tapered sleeve 31 to the left (Figures 1-4) against the action of the spring 32 so as to escape through the passage 21 into the chamber 17. Thus, the displaced liquid has a different path on return movement of the shock absorber parts to that on the outward path.

It will also be seen that on the outward path the resistance to flow depends on the load created by the spring 34 which is adjusted externally of the shock absorber and also by the position of the spindle 25, 26 which itself varies with displacement of the arm 12 due to the cam surface 27 on the shaft 11, that is to say when the arm 12 is angularly displaced by a relatively large amount the spindle 25, 26, is displaced to the right to place a higher load on the ball valve than when the arm 12 is angularly displaced by a smaller amount.

On the return movement the resistance to flow created by the spring 32 which depends firstly on the degree of angular displacement of the arm 12 and secondly the hydraulic load through the wedge 37.

Thus the initial resistance to fluid displacement in either direction of flow is adjustable by predetermined amounts to compensate for varying loads on a vehicle on which the shock absorber is mounted, whilst in addition, a variable resistance with actuation of the shock absorber is created, which variable resistance depends on the amplitude of displacement itself of the shock absorber parts, that is to say, it increases with increased displacement of the parts and vice versa.

It will be observed that in order to permit the passages 21, 22 to lead from opposite sides of the valves 29, 31, to the extreme ends of their associated cylinders 17, 18 respectively, the passage 21 is inclined relatively to the bore 23 whilst the passage 22 lies normal to said bore. In this way, both passages 21, 22 are uncovered throughout the strokes of the pistons 15, 16.

The valves 29, 31 may be adjusted in unison by the operation of the wedge 37 or by manipulation of the cap 35. By proper manipulation of the adjusting cap 35 and the adjusting means for the wedge 37, a differential adjustment of the tension of the springs 34, 32 for the valves 29, 31, respectively, may be obtained.

It is to be clearly understood that minor changes in the details of construction and arrangement of parts may be made without departing from the scope of the invention as set forth in the appended claims.

I declare that what I claim is:—

1. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of cylinders within which said pistons operate, a spindle longitudinally displaceable within a bore of said casing under the control of said cam face, a pair of conduits between said cylinders and said bore, and a pair of valves in adjacent relationship at the opposite end of said spindle to that engaged by said cam face and between the entrances of said conduits in said bore, both of said valves being loaded according to spindle displacement with one valve restricting fluid flow in one direction between the cylinders and the other restricting flow in the opposite direction.

2. A differential pressure operated damping means comprising a bored casing adapted to be connected to one of a pair of elements whose relative displacement is to be damped, a shaft connected to the other element of said pair, a pair of pistons longitudinally displaceable in opposite directions in accordance with angular displacement of said shaft, a pair of cylinders within which said pistons operate, conduits between said cylinders, a pair of valves for resisting fluid flow in opposite directions through said conduits on said piston displacement, means movable with said shaft for automatically controlling said valves in accordance with angular displacement of said shaft and said piston displacement and means for applying an initial predetermined load on said valves.

3. A differential pressure operated damping means comprising a bored casing adapted to be connected to one of a pair of elements whose relative displacement is to be damped, a shaft connected to the other element of said pair, a pair of pistons longitudinally displaceable in opposite directions in accordance with angular displacement of said shaft, a pair of cylinders within which said pistons operate, conduits between said cylinders, a pair of valves for resisting fluid flow in opposite directions through said conduits on said piston displacement, means movable with said shaft for automatically controlling said valves in accordance with angular displacement of said shaft and said piston displacement, means for applying an initial predetermined load on both valves, and means for varying the initial load on said valves.

4. A differential pressure operated damping means comprising a bored casing adapted to be connected to one of a pair of elements whose relative displacement is to be damped, a shaft connected to the other element of said pair, a pair of pistons longitudinally displaceable in opposite directions in accordance with angular displacement of said shaft, a pair of cylinders within which said pistons operate, conduits between said cylinders, a pair of valves for resisting fluid flow in opposite directions between said conduits on said piston displacement, a separate spring load for each valve, adjusting means for effecting initial adjustment of each spring load in unison by a predetermined amount common to both valves, means for automatically varying said load in accordance with angular displacement of said shaft and displacement of said pistons and means operable independently of said adjusting means for additionally adjusting each spring load.

5. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of cylinders within which said pistons operate, a spindle longitudinally displaceable within a bore of said casing under the control of said cam face, a pair of conduits between said cylinders and said bore, a ball valve seated on one end of said spindle, a sleeve valve mounted about said spindle at that end forming the seating for said ball valve and a pair of springs forming a resilient load on said valves with each of said springs variably loaded in accordance with displacement of said spindle on angular displacement of said shaft.

6. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of cylinders within which said pistons operate, a spindle longitudinally displaceable within a bore of said casing under the control of said cam face, a pair of conduits between said cylinders and said bore, a ball valve seated on one end of said spindle, a sleeve valve mounted about said spindle at that end forming the seating for said ball valve, a spring load on each valve which is varied in accordance with angular displacement of said shaft, adjusting means for initially varying the load on both valves in common and means operable independently of said adjusting means for initially varying the load on the valves whereby to effect a differential adjustment of the spring loads for said valves.

7. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of cylinders within which said pistons operate, a spindle longitudinally displaceable within a bore of said casing under the control of said cam face, an inclined conduit between one cylinder and said bore intermediate the ends of said spindle and a second conduit between the second cylinder and said bore beyond the free end of said spindle, a ball valve seated on the free end of said spindle, a sleeve valve mounted about the free end of said spindle, a spring load on each valve which is varied in accordance with angular displacement of said shaft, adjusting means for initially varying the load on both valves in common and means operable independently of said adjusting means for initially varying the load on the valves whereby to effect a differential adjustment of the spring loads for said valves.

8. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of cylinders within which said pistons operate, a spindle formed of two coaxial parts displaceable in unison within the bore of said casing under the control of said cam face, means for varying the effective length of said spindle independently of angular displacement of said shaft, an inclined conduit between one cylinder and said bore intermediate the ends of said spindle and a second conduit between the second cylinder and said bore beyond the free end of said spindle, a ball valve seated on the free end of said spindle, a sleeve valve mounted about the free end of said spindle, a spring load on each valve which is varied in accordance with angular displacement of said shaft, and means initially varying the load on the valves independently of the variation of the effective length of said spindle.

9. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions of said shaft, a pair of cylinders within which said pistons operate, a spindle formed of two co-axial parts displaceable in unison within a bore of said casing under the control of said cam face, a transverse wedge between said spindle parts for adjusting its effective length, means for displacing said wedge, an inclined conduit between one cylinder and said bore intermediate the ends of said spindle and a second conduit between the second cylinder and said bore beyond the free end of said spindle, a ball valve seated on the free end of said spindle, a sleeve valve mounted about the free end of said spindle, a spring load on each valve which is varied in accordance with angular displacement of said shaft, and means for initially varying the load on the valves independently of the adjustment of the effective length of said spindle by said transverse wedge.

FULLERTON GEORGE
GORDON ARMSTRONG.